July 27, 1937.    T. A. PARMENTER    2,088,156
WHEEL OR GEAR PULLER
Filed Sept. 27, 1935

THEODORE A. PARMENTER  INVENTOR.

BY
Merrill M. Blackburn
ATTORNEY

Patented July 27, 1937

2,088,156

UNITED STATES PATENT OFFICE 2,088,156

WHEEL OR GEAR PULLER

Theodore A. Parmenter, Racine, Wis., assignor to Rex Accessories Company, Racine, Wis., a corporation of Wisconsin Application September 27, 1935, Serial No. 42,437

2 Claims. (Cl. 29—85)

The present invention relates to what is known commercially as wheel pullers although, strictly speaking, they do not pull the wheel, the axle being driven out of the wheel or the shaft out of the gear, when used as a gear puller.

Among the objects of this invention are the provision of improved apparatus for the purpose indicated; the provision of an apparatus of the type indicated in which danger of injury to the apparatus during use thereof is reduced to a minimum; the provision of apparatus of the character indicated in which the driving pin is slidably movable with relation to the supporting framework whereby injury to the threads of the apparatus is minimized; and such further objects, advantages, and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Figure 1:
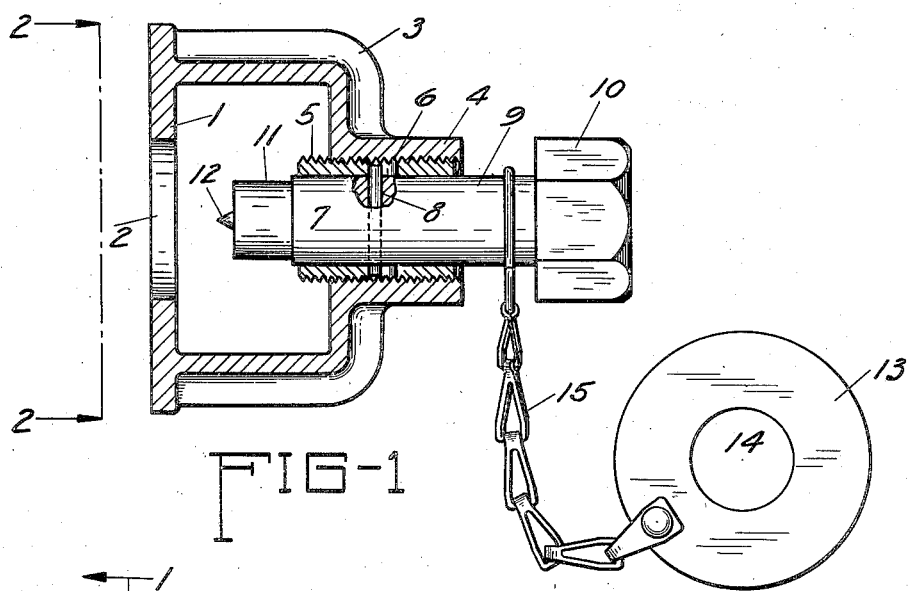
Fig. 1 represents a longitudinal section approximately along the plane indicated by the line 1—1, Fig. 2.
Figure 2:
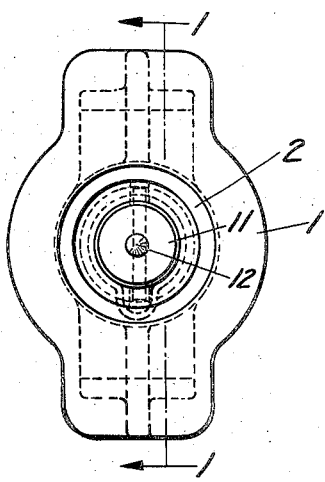
Fig. 2 is an end elevation taken in the direction indicated by the line 2—2, Fig. 1.
Figure 3:
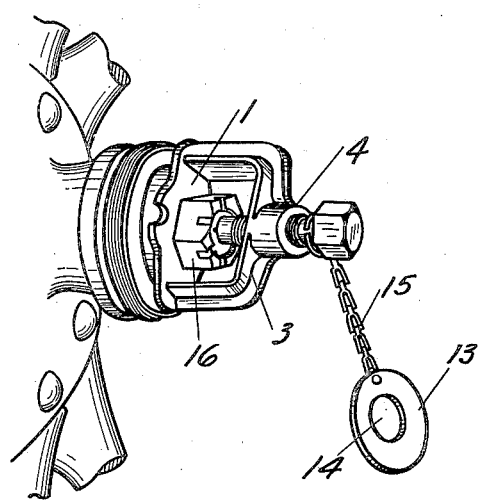
Fig. 3 is a perspective view showing how my device is attached to the end of the axle, a part of the wheel being shown to illustrate the position of the apparatus.

Reference will now be made in greater detail to the annexed drawing for a more complete disclosure of this invention. A plate or body member 1 is provided with an opening 2, preferably in the form of an aperture through the plate but which may take the form of a notch extending inwardly from one edge of the plate. A yoke 3 is preferably formed integrally with the plate or body member 1 but may be formed separately therefrom and secured thereto. This yoke 1 is provided with an enlargement 4 which has an opening therethrough, preferably in approximate axial alignment with the opening 2. As shown, this opening is preferably screw-threaded although, in a less desirable form of this device, it may be smooth. In the preferred form, as shown, there is a sleeve 5 within the enlargement 4 and this is screw-threaded to cooperate with the screw-threading within the enlargement. Openings 6, preferably a pair of slots, are formed through the sleeve 5 for the reception of a pin 8 mounted in the body 9 of a bolt or pin 7 which is provided at one end with a head 10 and at its opposite end with a reduced extension 11. On the end of the extension toward the opening 2 is a point 12 which cooperates with a depression in the end of the vehicle axle, as these are commonly constructed.

As indicated above, the construction as shown is the preferred form. However, various modifications of this construction may be made. As indicated, if the opening in the enlargement 4 is smooth, then the exterior surface of the sleeve 5 will be smooth so as to have a sliding fit within the enlargement 4. In this event, the sleeve 5 and body 9 may have screw-threaded connection which will take the place of the screw-threaded connection shown in Fig. 1. In such a construction, the slot 6 in the sleeve 5 would be more elongated as it would be needful for the sleeve to have greater sliding capacity.

Another modification which might be made would be to provide the extension 11 with screw threads for the reception of a nut which would serve instead of the pin 8 for limiting the sliding motion of the bolt 7 with relation to the sleeve. Another expedient, but less desirable, for permitting sliding movement of the driving pin or bolt with relation to the sleeve 5 is to have the opening longitudinally of the sleeve of noncircular cross section, and the cross section of the pin 7 the same as the opening through the sleeve. This will permit the pin 7 to slide in the sleeve but will enable the operator to rotate the sleeve 5 so as to cause longitudinal movement thereof with relation to the enlargement 4.

A washer 13, having an opening 14 of smaller diameter than the opening 2, is connected to the pin by means of the flexible connecting means 15 which permits use of the washer when needed but insures against its loss at other times. If the opening 2 is larger than the extreme dimensions of the nut 16, then the washer 13 may be put on the end of the axle after the body 1 has been applied and before the nut has been added. This will insure that the device will be held in place when in use.

In the use of the device, the nut 16 is first removed from the axle and then the puller is applied thereto and the nut 16 replaced but not tightened up so as to hold the puller tightly against the hub as there must be capability of motion between the axle and the hub. After the nut has been screwed on part way, then the pin or bolt 7 is turned until the sleeve 5 carries the point 12 into the depression in the end of the axle. Rotation of the bolt is continued until the sleeve is drawn in until the opposite end of the opening 6 engages the pin 8, that is, the pin 8 is moved to the opposite end of the slot 6 from what is shown in Fig. 1. When the parts are tightly enough engaged so that the device is held properly positioned, then the bolt 7 is struck on its exposed end so as to drive the axle away from the wheel. The same procedure would be followed if one were removing a gear instead of a wheel.

While I have disclosed the preferred construction and some of the modifications of my invention, it is of course understood that the specific description of structure set forth above may be departed from without departing from the spirit of my invention as set forth in this specification and the appended claims.

Having now described my invention, I claim:

1. A wheel puller comprising an apertured plate to be loosely mounted upon the end of an axle between the wheel hub and nut, a yoke extending outwardly from the plate in the direction of the axis of the axle, said yoke being open laterally for the insertion of the nut, a screw-threaded sleeve engaging the threads of and movable in a screw-threaded opening in said yoke, an unthreaded bolt slidable in said sleeve, said sleeve making it possible to adjust the bolt so that it will cooperate with the plate and yoke in holding the puller to the nut and in alignment with the axle, and a pin projecting laterally from the cylindrical surface of the bolt into an opening in the sleeve, said pin being smaller than the opening in the sleeve.

2. A wheel puller comprising an apertured plate to be loosely mounted upon the end of an axle between the wheel hub and nut, a yoke extending outwardly from the plate in the direction of the axis of the axle, said yoke being open laterally for the insertion of the nut, a screw-threaded sleeve engaging the threads of and movable in a screw-threaded opening in said yoke, an unthreaded bolt slidable in said sleeve, said sleeve making it possible to adjust the bolt so that it will cooperate with the plate and yoke in holding the puller to the nut and in alignment with the axle, and means connecting the sleeve and bolt so that rotation of the bolt will cause rotation of the sleeve.

THEODORE A. PARMENTER.